(12) United States Patent
Truong

(10) Patent No.: US 11,319,062 B1
(45) Date of Patent: May 3, 2022

(54) CONTRA-ROTATING ROTORS WITH DISSIMILAR NUMBERS OF BLADES

(71) Applicant: Bell Textron Inc., Fort Worth, TX (US)

(72) Inventor: Alexander Dang Quang Truong, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/067,723

(22) Filed: Oct. 11, 2020

(51) Int. Cl.
*B64C 11/00* (2006.01)
*B64C 27/10* (2006.01)

(52) U.S. Cl.
CPC ............ *B64C 27/10* (2013.01); *B64C 11/001* (2013.01)

(58) Field of Classification Search
CPC ......... B64C 27/32; B64C 27/46; B64C 11/00; B64C 11/16; B64C 11/001
See application file for complete search history.

(56) References Cited

U.S. PATENT DOCUMENTS

| | | | | |
|---|---|---|---|---|
| 1,453,951 | A * | 5/1923 | Mortimer | B64C 11/00 60/269 |
| 3,301,509 | A * | 1/1967 | Sendish | B64C 11/001 244/209 |
| 10,752,352 | B2 * | 8/2020 | Brand | B64C 27/28 |
| 2021/0009263 | A1 * | 1/2021 | Rowe | B64C 39/024 |

FOREIGN PATENT DOCUMENTS

| | | | | |
|---|---|---|---|---|
| EP | 3431385 | A1 * | 1/2019 | B64C 29/0025 |
| FR | 3057540 | A1 * | 4/2018 | B64C 27/20 |

OTHER PUBLICATIONS

"VIBHRAM—24 Hours Hovering Helicopter", 34th Annual AHS International Student Design Competition, IIT Kanpur—Indian Institute of Technology, Kanpur, 2017, 19 pages.

* cited by examiner

*Primary Examiner* — Brian M O'Hara
(74) *Attorney, Agent, or Firm* — Lightfoot & Alford PLLC

(57) ABSTRACT

A rotor system has a mast axis, a first rotor rotatable about the mast axis in a first direction and the first rotor has a first number of first rotor blades, and a second rotor rotatable about the mast axis in a second direction and the second rotor has a second number of second rotor blades that is different than the first number. The second direction is opposite the first direction.

19 Claims, 6 Drawing Sheets

CONTRA-ROTATING ROTORS WITH DISSIMILAR NUMBERS OF BLADES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Some rotorcraft utilize contra-rotating coaxial rotors on a main mast to create lift. In many cases, using the contra-rotating coaxial rotors reduces or removes a need for a tail rotor system or any other system for preventing rotation of a fuselage about the main mast axis. However, use of the counter rotating coaxial rotors normally results in undesirable noise associated with the rotor blades of a first rotor repeatedly overlapping the rotor blades of a second rotor and the rotor blades of the second rotor passing through air vortices generated by the first rotor. Another reason for using counter-rotating rotors is to solve the retreating blade stall and still maintain vehicle roll moment balance in level flight.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
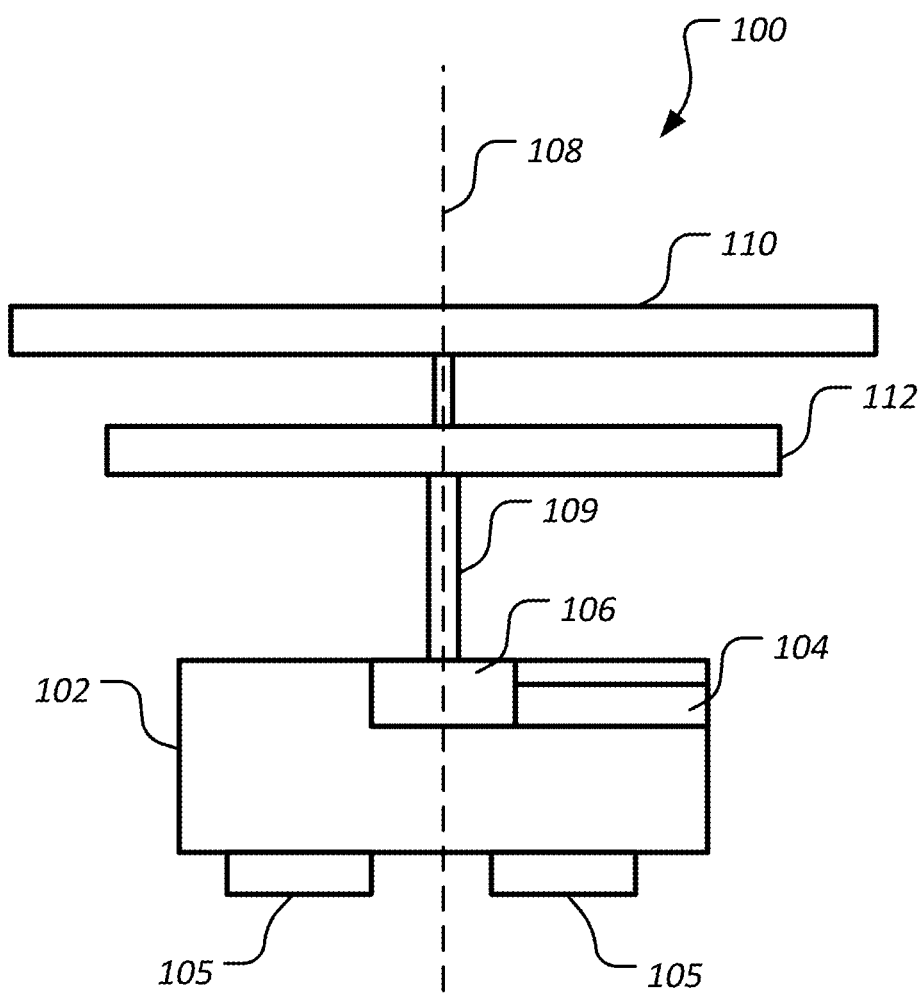
FIG. 1 is a schematic view of a rotorcraft according to an embodiment of this disclosure.

Referring now to FIG. 1, a schematic representation of a rotorcraft 100 is shown. Rotorcraft 100 comprises a fuselage 102, and engine 104, landing gear 105, a transmission 106, a mast axis 108, a mast system 109 rotatable about mast axis 108, a first rotor 110 carried by the mast system 109, and a second rotor 112 that is coaxial with first rotor 110 and which is carried by the mast system 109. In this embodiment, engine 104 can be operated to power transmission 106 and transmission 106 can be operated to rotate mast system 109 about mast axis 108, a portion in a first direction 114 to rotate first rotor 110 and a portion to rotate in a second direction 116 that is opposite the first direction 114 to contra-rotate second rotor 112 relative to first rotor 110. In this embodiment, the contra-rotation of second rotor 112 relative to first rotor 110 removes the need for any tail rotor system although other embodiments may utilize a tail rotor system or other anti-torque devices to angularly stabilize fuselage 102 about mast axis 108 during flight. It will be appreciated that in FIG. 1, first rotor 110 and second rotor 112 are schematically represented generally as geometric rotor discs, and that the geometric rotor discs are each meant to represent an envelope of a collection of multiple rotor blades which are described in greater detail below. In an alternative embodiment, rotorcraft 100 can be compounded with a pusher prop for higher speed flight and/or can contain multiple of the counter-rotating rotors with dissimilar number of blades.

Figure 2:
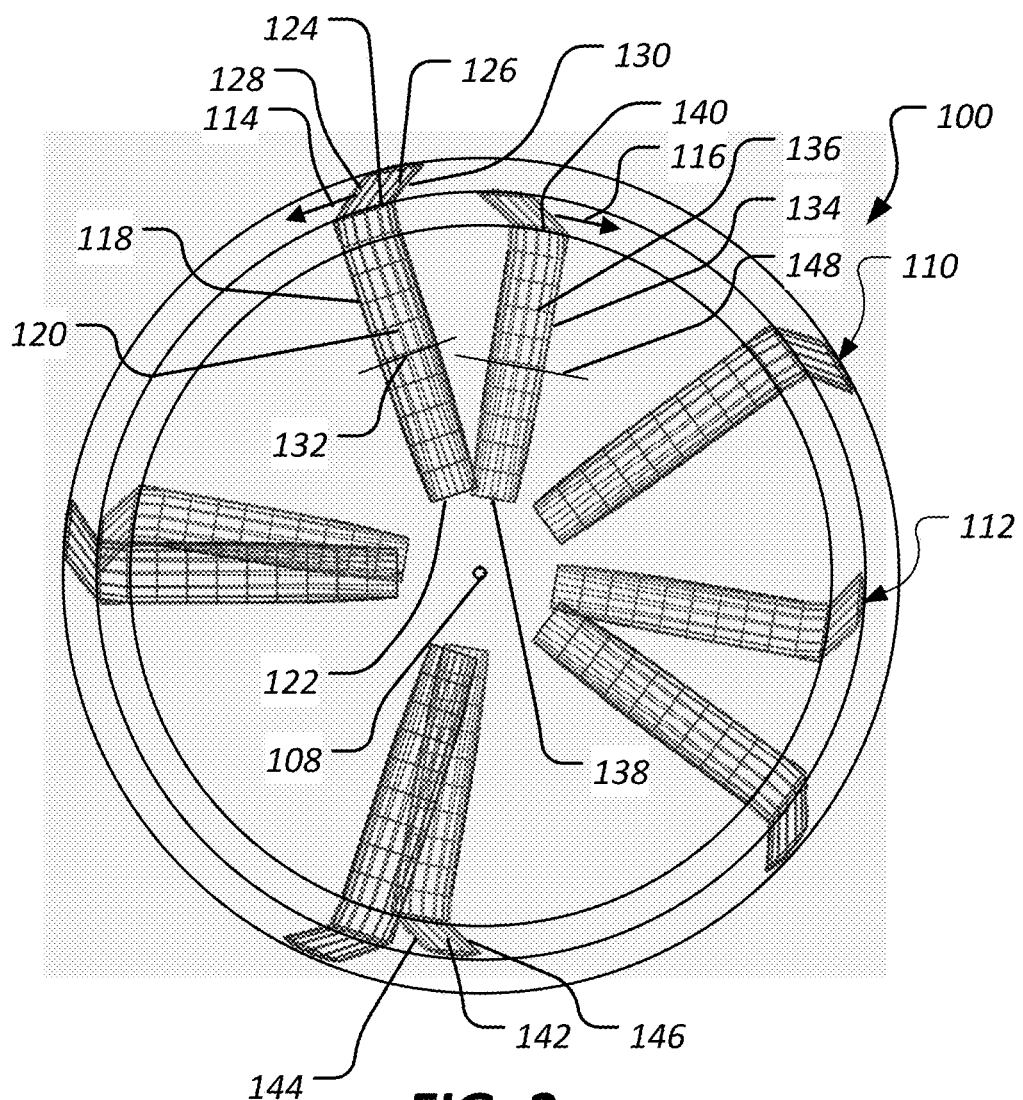
FIG. 2 is a top view of the rotors of the rotorcraft of FIG. 1.
Figure 3:
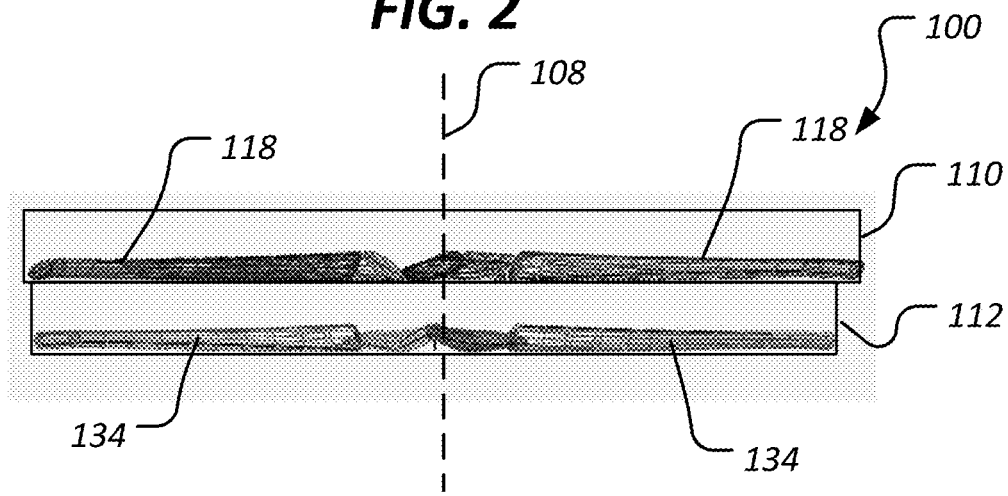
FIG. 3 is a side view of the rotors of FIG. 2.
Figure 8:
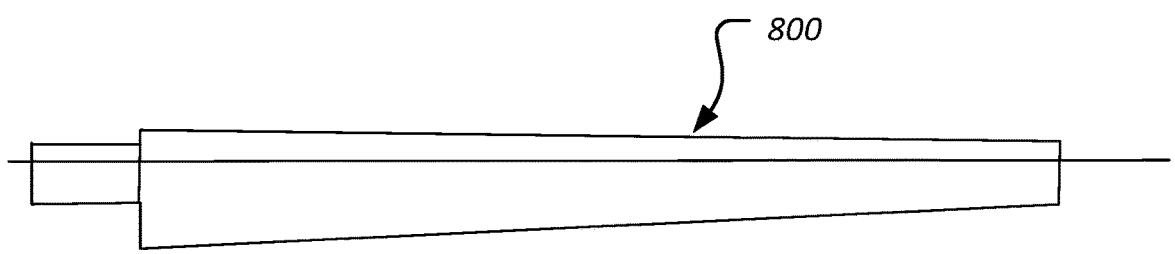
FIG. 8 is a top view of a rotor blade according to an embodiment of this disclosure.
Figure 9:
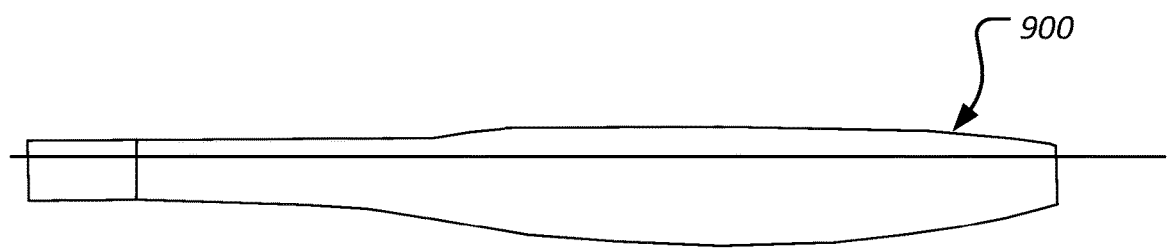
FIG. 9 is a top view of another embodiment of a rotor blade according to this disclosure.

Referring now to FIGS. 2 and 3, a top view and a side view of first rotor 110 and second rotor 112 are shown. First rotor 110 comprises five rotor blades 118 substantially evenly angularly distributed about mast axis 108. Each rotor blade 118 comprises a main blade portion 120 having a root end 122 and an outboard end 124. Each rotor blade 118 is further configured to carry a wing tip 126 comprising a leading edge 128 and a trailing edge 130. In this embodiment, substantially all of main blade portion 120 is chorded such that it serves as an airfoil along substantially the entire length of main blade portion 120. However, in some embodiments less than the entire length of main blade portion 120 may not be chorded. For example, in some embodiments, some or all of an inboard half of main blade portion 120 (inboard of bisection line 132) may not be chorded or may not be continuously chorded. In some embodiments, one or more of the rotor blades utilized herein can comprise a substantially constant chord distribution as shown by rotor blade 800 in FIG. 8. Alternatively, one or more of the rotor blades utilized herein can, as compared to rotor blade 800, can have a greater amount of blade area located further away from the root section and closer to the outer tip of the rotor blade, such as rotor blade 900 shown in FIG. 9. By shifting the blade area toward the tip and further from the root, lift can be increased and drag can be reduced.

Second rotor 112 is situated below first rotor 110 and comprises four rotor blades 134 (fewer blades than first rotor 110) substantially evenly angularly distributed about mast axis 108. Each rotor blade 134 comprises a main blade portion 136 having a root end 138 and an outboard end 140. Each rotor blade 134 is further configured to carry a wing tip 142 comprising a leading edge 144 and a trailing edge 146. In this embodiment, substantially all of main blade portion 136 is chorded such that it serves as an airfoil along substantially the entire length of main blade portion 136. However, in some embodiments less than the entire length of main blade portion 136 may not be chorded. For example, in some embodiments, some or all of an inboard half of main blade portion 136 (inboard of bisection line 148) may not be chorded or may not be continuously chorded.

As mentioned above, during flight, first rotor blades 118 rotate in a counterclockwise direction about mast axis 108 and second rotor blades 134 rotate in a clockwise direction about mast axis 108, as viewed from above. It will be appreciated that in alternative embodiments, one or more of rotor blades 118, 134 may comprise no wing tips. Still further, it will be appreciated that in some embodiments, transmission 106 can be utilized to rotate first rotor 110 at an angular speed (rotations per minute) different than an angular speed of second rotor 112. In some cases, noise generated by the contra-rotation of first rotor 110 relative to second rotor 112 can produce relatively less noise than an embodiment of a contra-rotating coaxial rotor system at least in part because at no time are multiple rotor blades 118 substantially angularly aligned with multiple rotor blades 134. Because there is less overlap of the blades 118, 134 as viewed from above at any one time, noise from the interaction of the lower second rotor system 112 with the upper first rotor system 110 is reduced.

Figure 4:
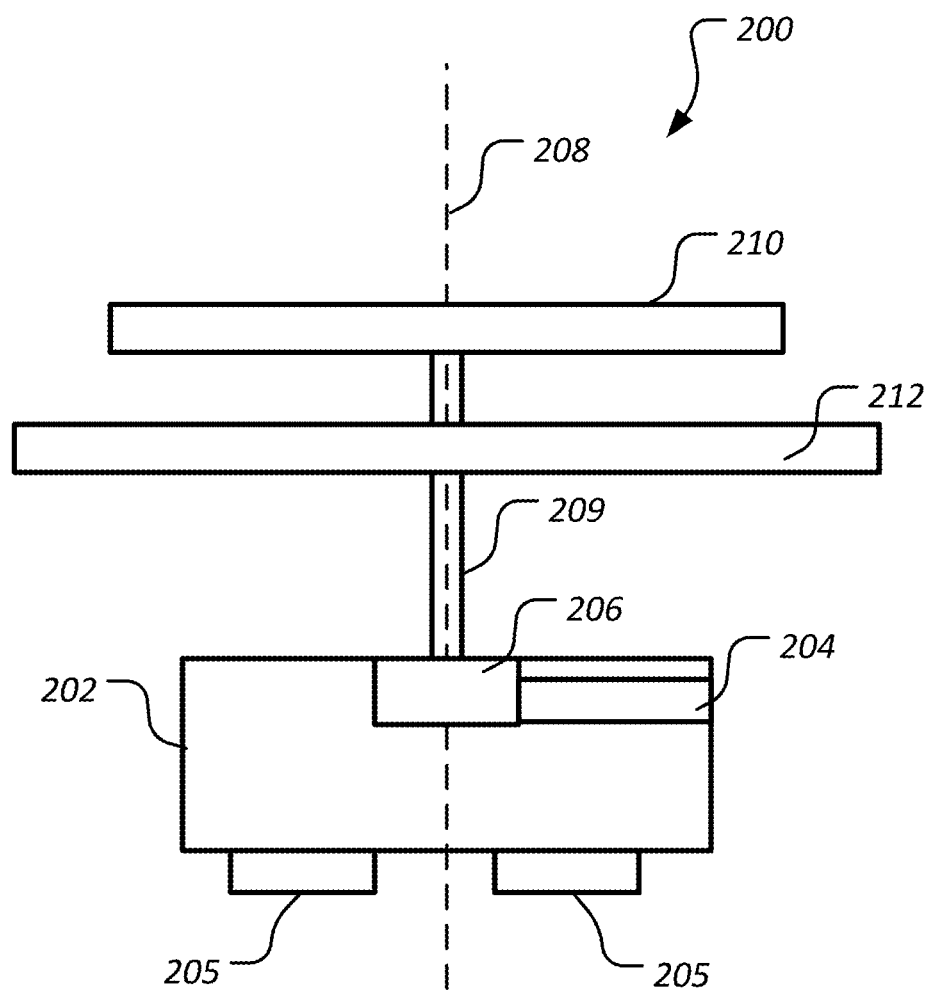
FIG. 4 is a schematic view of a rotorcraft according to another embodiment of this disclosure.

Referring now to FIG. 4, a schematic representation of a rotorcraft 100 is shown. Rotorcraft 200 comprises a fuselage 202, and engine 204, landing gear 205, a transmission 206, a mast axis 208, a mast system 209 rotatable about mast axis 208, a first rotor 210 carried by the mast system 209, and a second rotor 212 that is coaxial with first rotor 210 and which is carried by the mast system 209. In this embodiment, engine 204 can be operated to power transmission 206 and transmission 206 can be operated to rotate mast system 209 about mast axis 208, a portion in a first direction 214 to rotate first rotor 210 and a portion to rotate in a second direction 216 that is opposite the first direction 214 to contra-rotate second rotor 212 relative to first rotor 210. In this embodiment, the contra-rotation of second rotor 212 relative to first rotor 210 removes the need for any tail rotor system although other embodiments may utilize a tail rotor system or other anti-torque devices to angularly stabilize fuselage 202 about mast axis 208 during flight. It will be appreciated that in FIG. 4, first rotor 210 and second rotor 212 are schematically represented generally as geometric rotor discs, and that the geometric rotor discs are each meant to represent an envelope of a collection of multiple rotor blades which are described in greater detail below.

Figure 5:
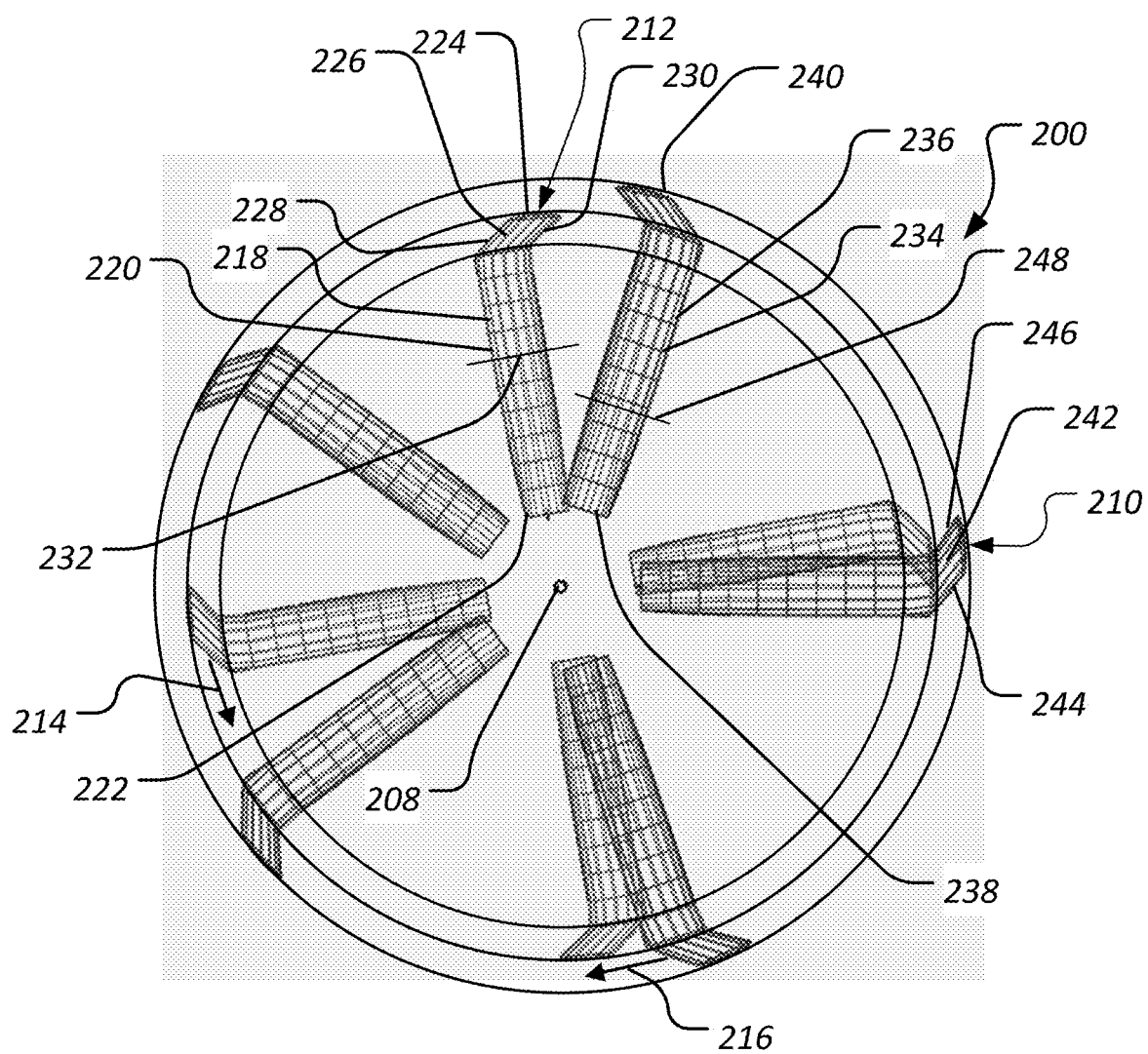
FIG. 5 is a top view of the rotors of the rotorcraft of FIG. 4.
Figure 6:
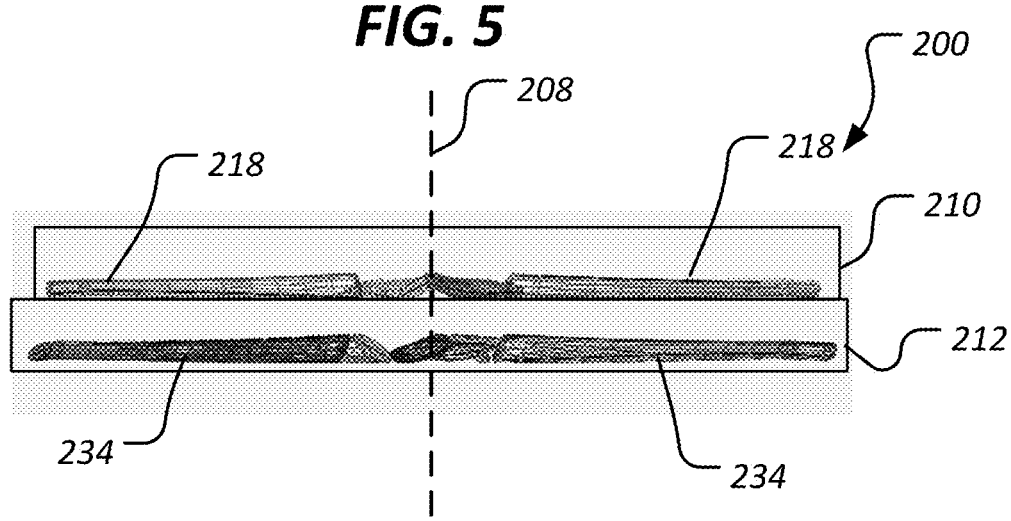
FIG. 6 is a side view of the rotors of FIG. 5.

Referring now to FIGS. 5 and 6, a top view and a side view of first rotor 210 and second rotor 212 are shown. First rotor 210 comprises four rotor blades 218 substantially evenly angularly distributed about mast axis 208. Each rotor blade 218 comprises a main blade portion 220 having a root end 222 and an outboard end 224. Each rotor blade 218 is further configured to carry a wing tip 226 comprising a leading edge 228 and a trailing edge 230. In this embodiment, substantially all of main blade portion 220 is chorded such that it serves as an airfoil along substantially the entire length of main blade portion 220. However, in some embodiments less than the entire length of main blade portion 220 may not be chorded. For example, in some embodiments, some or all of an inboard half of main blade portion 220 (inboard of bisection line 232) may not be chorded or may not be continuously chorded. In addition, having a dissimilar rotor count spread the sound energy to multiples of the blade pass frequency of the lower and blade path frequencies of the upper rotor rather than concentrating the tones to a single blade pass frequency typically seen in counter-rotating systems. Thus, the acoustic signature is more broadband and less annoying.

Second rotor 212 is situated below first rotor 210 and comprises five rotor blades 234 (more blades than first rotor 210) substantially evenly angularly distributed about mast axis 208. Each rotor blade 234 comprises a main blade portion 236 having a root end 238 and an outboard end 240. Each rotor blade 234 is further configured to carry a wing tip 242 comprising a leading edge 244 and a trailing edge 246. In this embodiment, substantially all of main blade portion 236 is chorded such that it serves as an airfoil along substantially the entire length of main blade portion 236. However, in some embodiments less than the entire length of main blade portion 236 may not be chorded. For example, in some embodiments, some or all of an inboard half of main blade portion 236 (inboard of bisection line) may not be chorded or may not be continuously chorded.

As mentioned above, during flight, first rotor blades 218 rotate in a clockwise direction about mast axis 208 and second rotor blades 234 rotate in a counterclockwise direction about mast axis 208, as viewed from above. It will be appreciated that in alternative embodiments, one or more of rotor blades 218, 234 may comprise no wing tips. Still further, it will be appreciated that in some embodiments, transmission 206 can be utilized to rotate first rotor 210 at an angular speed (rotations per minute) different than an angular speed of second rotor 212. In some cases, noise generated by the contra-rotation of first rotor 210 relative to second rotor 212 can produce relatively less noise than an embodiment of a contra-rotating coaxial rotor system at least in part because at no time are multiple rotor blades 218 substantially angularly aligned with multiple rotor blades 234. Because there is less overlap of the blades 218, 234 as viewed from above at any one time, noise from the interaction of the lower second rotor system 212 with the downwash of the upper first rotor system 210 is reduced.

Figure 7:
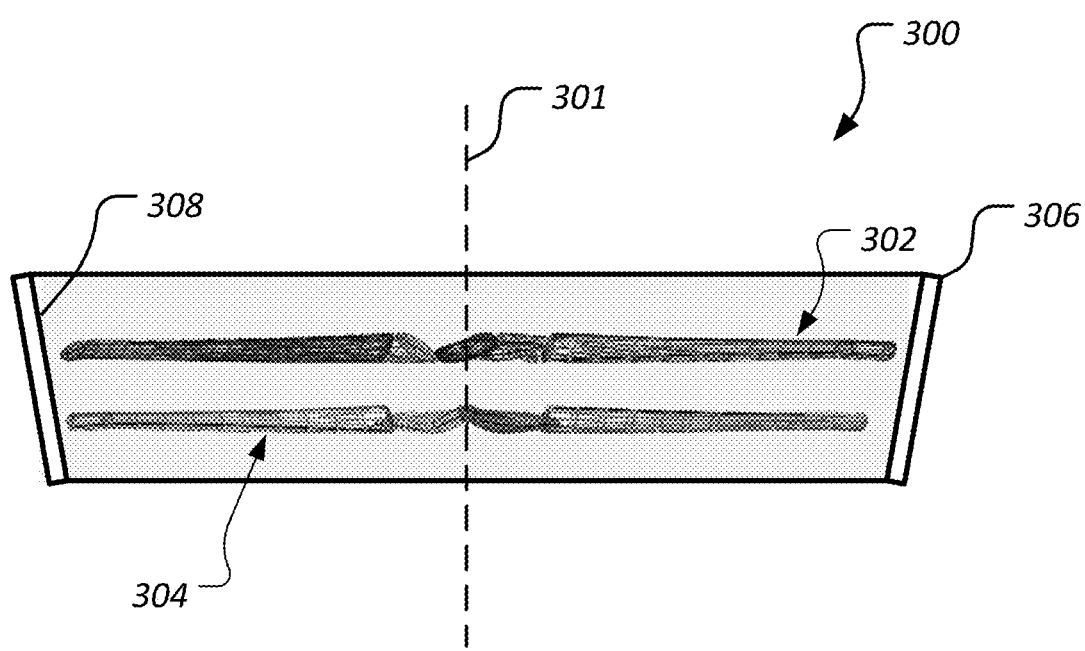
FIG. 7 is a schematic view of a rotor system according to this disclosure disposed within a duct.

Referring now to FIG. 7, a schematic representation of a ducted rotor system 300 is shown. Ducted rotor system 300 generally comprises first and second rotors 302, 304 disposed about rotor axis 301 which are contra-rotating rotors substantially similar to first rotor 110 and second rotor 112. In this embodiment, ducted rotor system 300 comprises a duct 306 that comprises a frustoconical interior profile 308. Accordingly, the larger diameter first rotor 302 is disposed in a larger diameter axial portion of duct 306 and smaller diameter second rotor 304 is disposed in a relatively smaller diameter axial portion of duct 306. In some embodiments, the first and second rotors 302, 304 may each be disposed in duct 306 so that a substantially constant gap is maintained between interior profile 308 and the rotor blades of both the first and second rotors 302, 304.

It will be appreciated that while some specific embodiments are shown and described in detail, alternative embodiments within the scope of this disclosure can comprise first and second rotors that comprise different numbers of rotor blades (such as 2 and 3; 3 and 4; 2 and 5; 4 and 6; and so on so long as the number of blades of the first rotor are different from the number of blades of the second rotor). Additionally, in some embodiments, the overall profile of rotor blades of a first rotor can be differently shaped as compared to the overall profile of rotor blades of a second rotor.

In some embodiments, the engines disclosed herein can comprise a gas turbine core. Alternatively, two electric motors can be utilized to power the different sets of rotor blades. Since the two coaxial sets of rotors provides symmetry of forces around the central axis for lifting One or more of the embodiments disclosed herein can reduce rotor-rotor interaction noise attributable to one or more of the following unsteady flow features: rear (or lower)-rotor upstream influence interacting with the front (or upper) rotor (potential interaction), tip vortices shed from the front rotor interfering with the rear rotor (BVI), and front rotor viscous wakes affecting the rear-rotor loading (wake interaction). In some embodiment, a low noise configuration incorporates dissimilar rotor blade count, as well as reduction in rear-rotor diameter to reduce upstream influence, tip-vortex, and wake interaction effects. In some embodiments, the front rotor has a higher blade count than the rear in order to reduce the blade loading and strength of the tip vortex. In alternative embodiments, the lower blade that has a forward sweep and backward sweep planform, such designs aims to avoid parallel interaction with the upward blade vortex that can generate intense noise.

Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotorcraft, comprising:
   a mast axis;
   a first rotor rotatable about the mast axis in a first direction and comprising a first number of first rotor blades;
   a second rotor rotatable about the mast axis in a second direction and comprising a second number of second rotor blades that is different than the first number of first rotor blades and wherein the second direction is opposite the first direction;
   wherein each of the first rotor blades and the second rotor blades are disposed within a duct comprising a frustoconical interior profile.

2. The rotorcraft of claim 1, wherein the first rotor is disposed above the second rotor.

3. The rotorcraft of claim 1, wherein the first rotor is disposed below the second rotor.

4. The rotorcraft of claim 1, wherein the first rotor is configured to selectively rotate at an angular velocity different than an angular velocity of the second rotor.

5. The rotorcraft of claim 1, further comprising:
   a fuselage and no tail rotor.

6. The rotorcraft of claim 1, wherein at least one first rotor blade of the first rotor comprises a blade tip.

7. The rotorcraft of claim 1, wherein at least one second rotor blade of the second rotor comprises a blade tip.

8. The rotorcraft of claim 1, wherein the first rotor comprises four first rotor blades and the second rotor comprises five second rotor blades.

9. The rotorcraft of claim 1, wherein the first rotor comprises five first rotor blades and the second rotor comprises four second rotor blades.

10. The rotorcraft of claim 1, wherein a gap between the first rotor blades and the interior profile of the duct is substantially the same in length to a gap between the second rotor blades and the interior profile of the duct.

11. A rotor system, comprising:
    a mast axis;
    a first rotor rotatable about the mast axis in a first direction and comprising a first number of first rotor blades;
    a second rotor rotatable about the mast axis in a second direction and comprising a second number of second rotor blades that is different than the first number of first rotor blades and wherein the second direction is opposite the first direction;
    wherein the first rotor blades and the second rotor blades are disposed within a duct comprising a frustoconical interior profile.

12. The rotor system of claim 11, wherein the first rotor is disposed above the second rotor.

13. The rotor system of claim 11, wherein the first rotor is disposed below the second rotor.

14. The rotor system of claim 11, wherein the first rotor is configured to selectively rotate at an angular velocity different than an angular velocity of the second rotor.

15. The rotor system of claim 11, wherein at least one first rotor blade of the first rotor comprises a blade tip.

16. The rotor system of claim 11, wherein at least one second rotor blade of the second rotor comprises a blade tip.

17. The rotor system of claim 11, wherein the first rotor comprises four first rotor blades and the second rotor comprises five second rotor blades.

18. The rotor system of claim 11, wherein the first rotor comprises five first rotor blades and the second rotor comprises four second rotor blades.

19. The rotor system of claim 11, wherein a gap between the first rotor blades and the interior profile of the duct is substantially the same in length to a gap between the second rotor blades and the interior profile of the duct.

* * * * *